United States Patent
Ash et al.

(10) Patent No.: US 7,254,669 B2
(45) Date of Patent: Aug. 7, 2007

(54) CREATE VIRTUAL TRACK BUFFERS IN NVS USING CUSTOMER SEGMENTS TO MAINTAIN NEWLY WRITTEN DATA ACROSS A POWER LOSS

(75) Inventors: Kevin J. Ash, Tucson, AZ (US); Michael T. Benhase, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 10/767,787

(22) Filed: Jan. 29, 2004

(65) Prior Publication Data

US 2005/0198446 A1 Sep. 8, 2005

(51) Int. Cl.
*G06F 12/00* (2006.01)

(52) U.S. Cl. .................. 711/103; 711/112; 711/156; 711/170

(58) Field of Classification Search .............. None
See application file for complete search history.

(56) References Cited

U.S. PATENT DOCUMENTS 5,301,304 A    4/1994  Menon
6,523,102 B1   2/2003  Dye et al.
2004/0088336 A1* 5/2004 Pasupathy ............. 707/205

FOREIGN PATENT DOCUMENTS

EP    0369934 A2    5/1990

OTHER PUBLICATIONS

Haskin, R., et al., "Recovery Management in QuickSilver", *ACM Transactions on Computer Systems*, vol. 6, No. 1, pp. 82-108, Feb. 1988.

* cited by examiner

*Primary Examiner*—Reginald Bragdon
*Assistant Examiner*—Ngoc Dinh
(74) *Attorney, Agent, or Firm*—Scully, Scott, Murphy & Presser, P.C.

(57) ABSTRACT

A method for storing customer data at a non-volatile storage (NVS) at a storage server. A track buffer is maintained for identifying first and second sets of segments that are allocated in the NVS. A flag in the track buffer identifies which of the first and second sets of segments to use for storing customer data for which a write request has been made. The customer data is stored in the NVS in successive commit processes. Following a power loss in the storage server, the NVS uses the track buffer information to identify which of the first and second sets of segments was involved in the current commit process to allow the current commit process to be completed.

25 Claims, 11 Drawing Sheets

FIG. 9

| | 902 | 904 | 906 | |
|---|---|---|---|---|
| 0 | "A" SEGMENTS | TRACK NVSCB | "B" SEGMENTS | USE A OR B |
| 1 | "A" SEGMENTS | TRACK NVSCB | "B" SEGMENTS | USE A OR B |
| 2 | "A" SEGMENTS | TRACK NVSCB | "B" SEGMENTS | USE A OR B |
| | | | | |
| X | "A" SEGMENTS | TRACK NVSCB | "B" SEGMENTS | USE A OR B |

908

900

950

| | | | | |
|---|---|---|---|---|
| 0 | | | | |
| 1 | | | | |
| 2 | | | | |
| X | | | | |

FIG. 10

| 902 | 904 | 906 | 908 |
|---|---|---|---|
| "A" SEGMENTS - LIST OF REAL NVS SEGMENTS USED FOR A WRITE TO THE TRACK BUFFER | TRACK NVSCB SHOWS CACHE VIEW OF THE TRACK IN NVS. | "B" SEGMENTS - LIST OF REAL NVS SEGMENTS USED FOR A WRITE TO THE TRACK BUFFER | USE A OR B SEGMENTS - INDICATOR TO KNOW WHICH LIST OF SEGMENTS WERE USED FOR THE WRITE FROM THE HOST ADAPTER | ns CREATE VIRTUAL TRACK BUFFERS IN
NVS USING CUSTOMER SEGMENTS TO
MAINTAIN NEWLY WRITTEN DATA
ACROSS A POWER LOSS

BACKGROUND OF THE INVENTION

1. Field of the Invention

The invention relates generally to the field of data storage in computer systems and, more specifically, to managing the allocation of non-volatile storage resources in a storage server to prevent data loss due to a power failure.

2. Description of the Related Art

Computer storage devices such as storage servers have high-capacity disk arrays to backup data from external host systems, such as host servers. For example, a large corporation or other enterprise may have a network of servers that each store data for a number of workstations used by individual employees. Periodically, the data on the host servers is backed up to the high-capacity storage server to avoid data loss if the host servers malfunction. A storage server may also backup data from another storage server, such as at a remote site. The storage servers are also known to employ redundant systems to provide additional safeguards against data loss. The IBM Enterprise Storage Server (ESS) is an example of a storage server.

A host system may send data to be backed up at a storage server via a host adapter at the storage server. The data is then transferred from the host adapter to a volatile cache, and from the cache to a non-volatile storage (NVS). However, various difficulties arise in allocating resources in the NVS for accommodating the transfer of the data in a manner that prevents data loss during a power failure.

BRIEF SUMMARY OF THE INVENTION

To overcome these and other deficiencies in the prior art, the present invention describes a method and system for allocating NVS resources in a storage server.

In a particular aspect of the invention, a method for storing customer data at a non-volatile storage (NVS) at a storage server includes initializing the NVS, prior to receiving a first write request at the storage server for writing first customer data to the NVS, by allocating first segments in the NVS for storing data, and, in response to receiving the first write request, allocating second segments in the NVS for storing additional data.

Related apparatuses and program storage devices are also provided.

BRIEF DESCRIPTION OF THE DRAWINGS

These and other features, benefits and advantages of the present invention will become apparent by reference to the following text and figures, with like reference numbers referring to like structures across the views, wherein:

FIG. 9 illustrates track buffer control blocks and the corresponding virtual track buffers, which are seen by the host adapters;

FIG. 10 illustrates a virtual track buffer data structure;

DETAILED DESCRIPTION OF THE INVENTION

Figure 1:
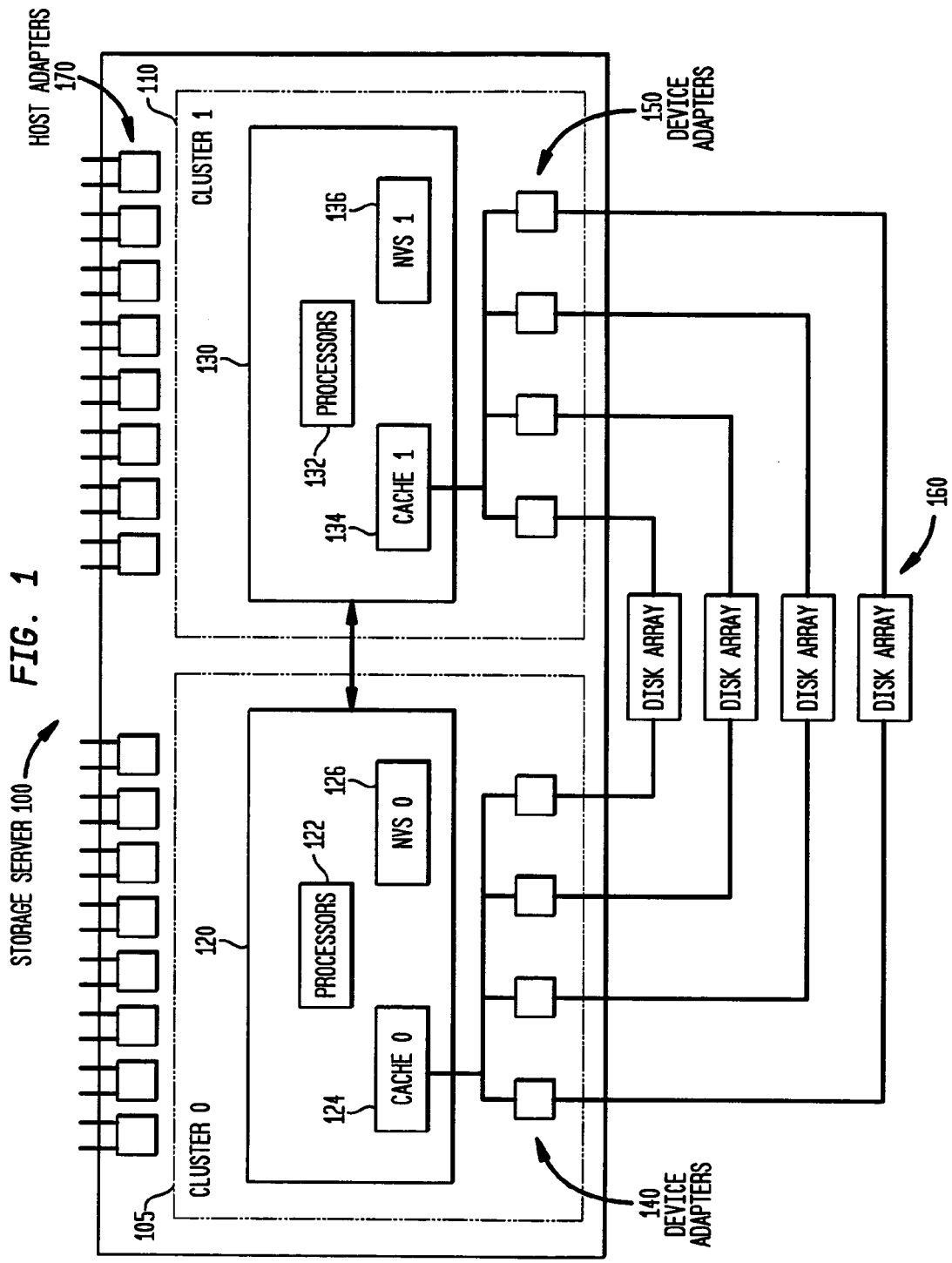
FIG. 1 illustrates an overview of a logical structure of a dual cluster storage server.

FIG. 1 illustrates an overview of a logical structure of a dual cluster storage server. A storage server 100, which may an IBM Enterprise Storage Server (ESS), for instance, is a high-capacity storage device that can back up data from a variety of different devices. For example, a large corporation or other enterprise may have a network of servers that each store data for a number of workstations used by individual employees. Periodically, the data on the host servers is backed up to the high-capacity storage server 100 to avoid data loss if the host servers malfunction. The storage server 100 can also provide data sharing between host servers since it is accessible to each host server. The storage server 100 itself has redundant storage resources to provide an additional safeguard against data loss. As a further measure, the data of the storage server 100 may be mirrored to another storage server, typically at a remote site. A storage server of a particular type, such as one that uses disk storage, may connect to one or more other peer disk storage servers as well as to other storage devices, such as those using magnetic tape. Communication between the devices may be achieved using any desired communication protocol and medium. A user interface may be provided to allow a user to access information regarding the status of the storage server 100.

The example storage server 100 includes two clusters for redundancy. Each cluster 105, 110, e.g., "cluster 0" and "cluster 1", respectively, works independently, and may include cluster processor complexes 120, 130 with processors 122, cache 124, 134, nonvolatile storage (NVS) 126, 136, and device adapters 140, 150. The device adapters (DA) 140, 150 are used to connect the disks 160 to the caches 124, 134 in the cluster processor complexes 120, 130. In one possible design, each cluster 105, 110 contains four device adapters 140, 150. Each adapter is part of a pair, one on each cluster. A pair supports two independent paths to all of the disk drives served by the pair. Each disk array is configured to be accessed by only one of the clusters. However, if a cluster failure occurs, the surviving cluster automatically takes over all of the disks. The disk arrays or ranks 160 can be configured as RAID 5 (redundant array of independent disks) or non-RAID arrays. Alternatively, another high-capacity storage medium may be used.

Processors 122 and 132 execute software, firmware and/or micro code, e.g., computer code devices, stored in an associated memory to achieve the functionality described herein. Such memories may be considered to be program storage devices. The memories may be provided, e.g., in a region of the respective cache that is preserved during a reboot, or in a separate non-volatile memory.

Host adapters (HAs) 170 are external interfaces that may support two ports, e.g., either small computer systems interface (SCSI) or IBM's enterprise systems connection (ESCON), which is an Enterprise Systems Architecture/390 and zSeries computer peripheral interface. This I/O interface uses ESA/390 logical protocols over a serial interface that configures attached units to a communication fabric. For example, a remote storage server, host servers and a user interface may communicate with the storage server 100 via the HAs. Fibre channel or fibre-channel connection (FICON) has support for one channel per HA. Each HA connects to both cluster processor complexes 120, 130 so that either cluster can handle I/Os from any host adapter. A system adapter identification number (SAID) is a unique identification number automatically assigned to each HA. The storage server 100 contains four host-adaptor bays, each of which is connected to both clusters 105, 110 for redundancy.

Figure 2:
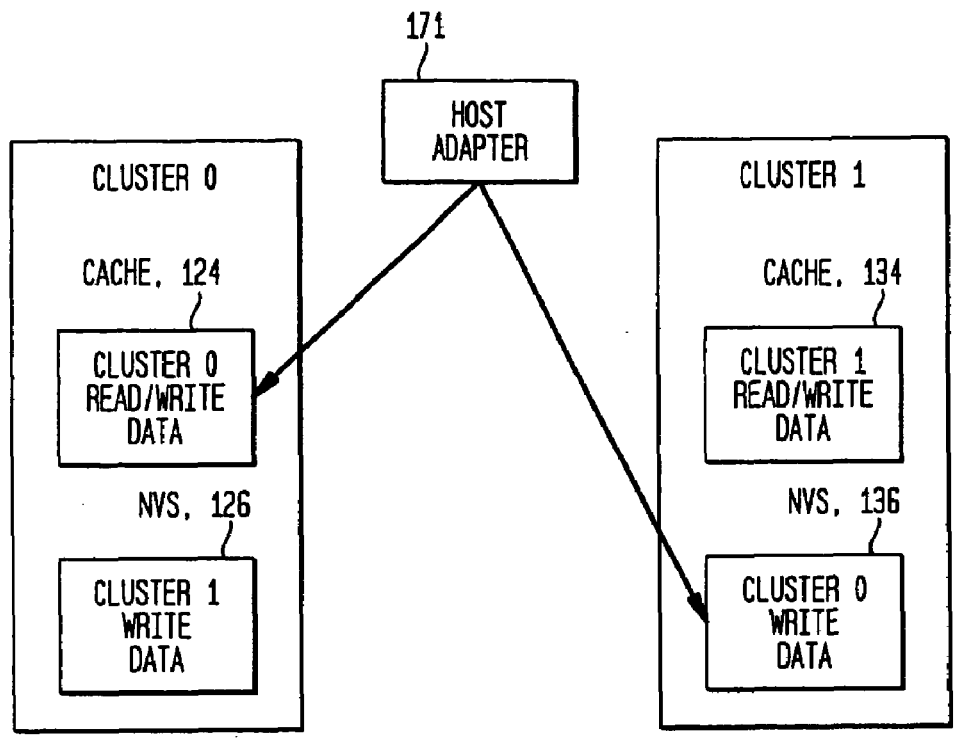
FIG. 2 illustrates the storage of data in cache and non-volatile storage.

FIG. 2 illustrates the storage of data in cache and non-volatile storage during normal operations, e.g., with no power loss. In the cluster processor complex 120, the cache 124 stores read and write data for cluster 0. Write data refers to data that is to be written to the disk arrays 160 or other high-capacity storage medium. For example, this may be data that is received from a host server via one of the host adapters 170. This data is to be destaged or written to the disk arrays 160 as a backup measure. It is particularly important to safeguard the write data, since it is modified data that cannot be recovered from the disk arrays 160. Read data refers to data that has been read from the disk arrays 160 or other high-capacity storage medium. For example, this may be data that is to be communicated to a host server via one of the host adapters in a scenario where the host server has lost its data due to a failure. It is acceptable for read data to be lost from cache since it can be read again from the disk arrays. Read and write operations for the cache 124 occur via the associated device adaptors 140. The NVS 126 for the cluster processor complex 120 stores write data for cluster processor complex 130 as a backup to the data stored in the cache 134.

Analogously, in the cluster processor complex 130, the cache 134 stores read and write data for cluster 1 (110). The NVS 136 for the cluster processor complex 130 stores write data for the cluster processor complex 120 as a backup to the data stored in the cache 124. Read and write operations for the cache 134 occur via the associated device adaptors 150. Thus, the track data from the host adapter 171 is written to the cache 124 of cluster 0 and the NVS 136 of cluster 1, or to the cache 134 of cluster 1 and the NVS 126 of cluster 0.

Generally, if data requested by a host resides in one of the caches 124, 134, an immediate data transfer takes place. If the data is not in the caches, one of the clusters sends a request to its device adapter to retrieve the data from the disk arrays 160. When a read operation arrives at a cluster, a cache hit occurs if the requested data resides in the cache, resulting in better performance. A cache miss occurs if the data is not in the cache. The I/O device is disconnected from the host and a stage operation occurs, which involves reading data from a disk drive into the cache. The NVSs 126, 136, which are battery backed memories, improve performance by allowing write I/O operations to complete after the data is stored in NVS, but before the data is destaged to the disk arrays 160. If a cluster fails, the surviving cluster can access the write data of the failed cluster in its local NVS. The caches 124, 134 are volatile memories that are not battery backed.

In one approach to a cached control storage server, the NVS memory in which the customer data was stored was provided on a card, and the size of the memory was larger than the PCI window space allowed to access the NVS card. Contiguous areas of memory called "track buffers" were used to allow the host adapter cards to write customer data into NVS. The NVS code would move the customer data using a hardware assist from the track buffer into the real customer segments once a communication such as a mail message was received from the host adapter to "commit" the data. The customer segments could be allocated even after a power loss since the customer data was sitting in a track buffer that was saved across the power loss. Since the NVS memory is allocated for customer track use, the allocation occurs on the Symmetric Multi-Processor (SMP), e.g., processors 122 and 132, where the cache is, and the NVS is told which segments to use for the track. However, in a recent design, the NVS function is moved from adapter cards to the main processor complex memory. Like the cache, the entire NVS memory can be mapped and seen by the host adapters. The hardware assist functions no longer exist to move customer data from one location to another. Real track buffers are no longer feasible since the main CPU processors would need to move the customer data from the track buffer to the real customer segments, but this would significantly reduce performance.

In accordance with the invention, NVS customer segments are pre-allocated into "virtual track buffers" and are sent to the NVS 126, 136. Before a virtual track buffer is allocated and used, a new set of NVS segments are allocated and sent to the NVS to be used the next time the virtual track buffer is used. The host adapter then writes the customer data into the virtual track buffer and sends a "commit" mail message to the NVS. The NVS maintains the virtual track buffer data across a power loss. If the commit processing occurs following a power loss, the NVS can tell the SMP which segments were used for the commit to enable the commit process to be completed for those segments.

In particular, before any host adapter 170 is allowed to write to the NVS 126, 136, virtual track buffers are allocated using real customer segments and sent to the NVS. These segments make up the first set of segments, termed "A" segments, that will be used for the first write to a track using a particular track buffer. This information is kept in an area of the NVS that is maintained across a power loss. When a host adapter wants to write a customer track into NVS, a new set of NVS segment are allocated and attached to the cache track temporarily. A virtual track buffer is then allocated for the transfer. The temporary NVS segments are removed from the cache track, and are used to create a set of second segments, termed "B" segments, that will be used the next time the virtual track buffer is used. The "A" segments are then attached to the cache track as the real NVS customer segments to use for the track. The "B" segments are then sent to NVS in preparation for the next write to the virtual track buffer. With this, the NVS knows the segments used for a write before a write can occur, and NVS maintains the knowledge across a power loss. Information is maintained within NVS as to which segments, "A" or "B", will be used for the write. The invention can be implemented using the data structures discussed herein.

Figure 3:
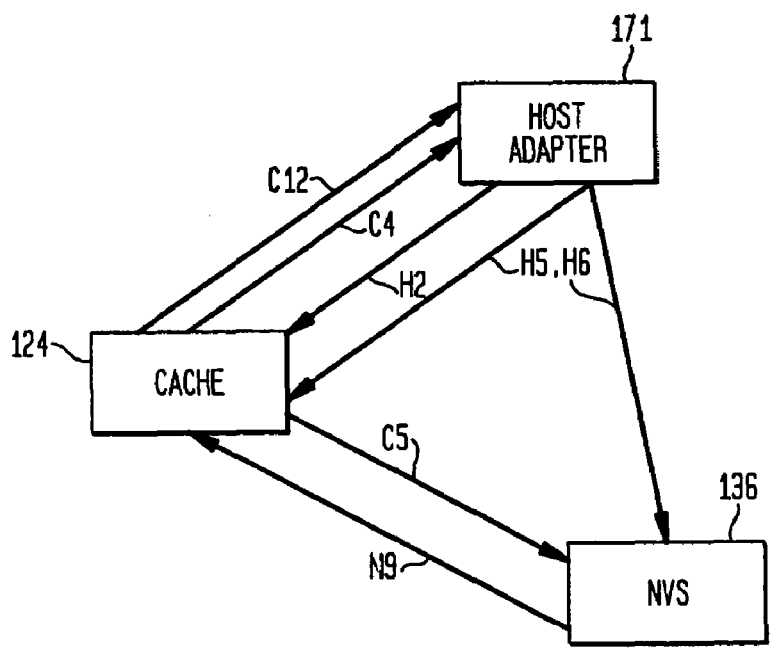
FIG. 3 illustrates a write scenario involving a host adapter, cache and NVS.
Figure 11:
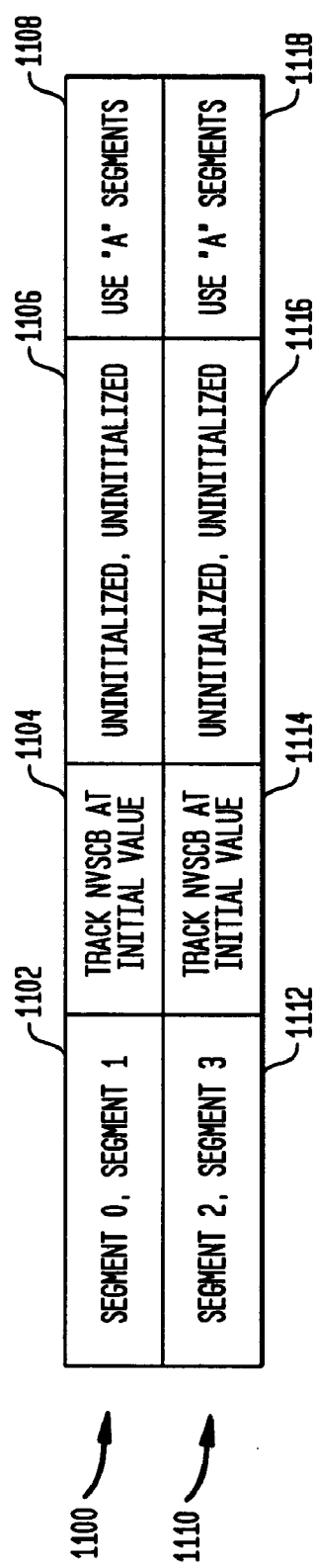
FIG. 11 illustrates an example of the virtual track buffer data structure.
Figure 12:
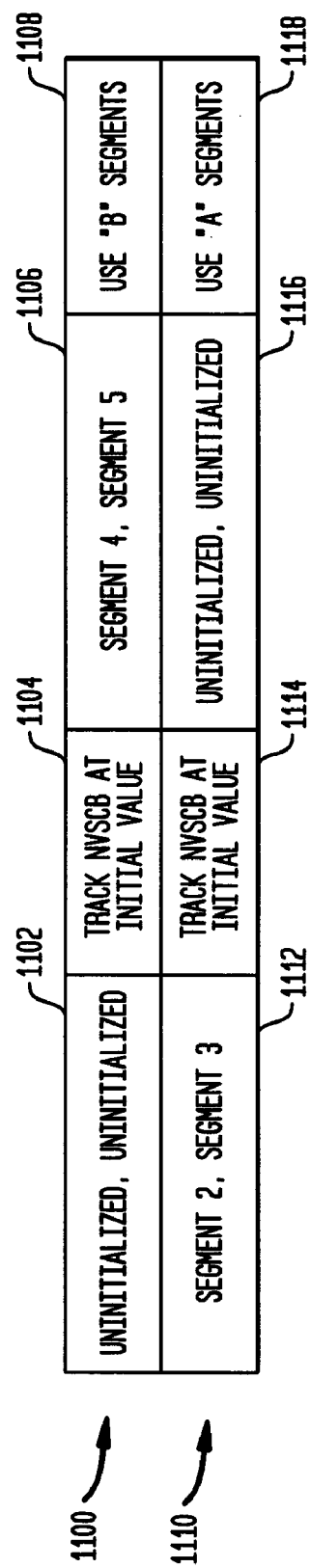
FIG. 12 illustrates the virtual track buffer of FIG. 11 after a first write operation.

FIG. 3 illustrates a write scenario involving a host adapter 171, cache 124 and NVS 136. The following steps provide an overview of a possible write scenario. Refer also to FIGS. 11 and 12. Steps preceded with "H" related to an action of the host adapter 171, while steps preceded with "N" relate to an action of the NVS 136, and steps preceded with "C" relate to an action of the cache 124. Not all messages or steps are shown.

H1. The host adapter gets a write request for a track from a host to store the host's customer data.

H2. The host adapter sends mail to the cache with a track id to allocate cache/NVS segments and NVS track buffer. The track buffer is comprised of a number of segments.

C3. In response to the mail from the host adapter, the cache allocates cache segments and creates a cache control block. Specifically, the cache allocates new NVS segments and attaches them to the cache control block. From FIG. 4, discussed further below, these would be segments 4 and 5. Note that, during an initialization procedure, before any request to store customer data is received at the cache from the host adapter, segments 0, 1 and 2, 3 were previously allocated. The Cache allocates NVS Track Buffer 0, moves segments 4 and 5 from the control block to "B" segments, and moves "A" segments 0 and 1 to the cache control block.

C4. Cache sends mail to host adapter with NVS track buffer number 0 to start the write.

C5. Cache builds and sends Track NVSCB control block and "B" segments to NVS to indicate the segments to use the next time track buffer 0 is used. The "Use A or B" indicator or flag is switched to use B.

H5. Using direct memory access (DMA), customer data is provided to the Cache segments, and the NVS "virtual track buffer" 0 is provided to the segments 0 and 1.

H6. Host adapter sends mail to Cache to commit data and sends mail to NVS with track buffer number used to commit data.

H7. Give device end to host indicating write complete. NVS will commit data even after power loss.

N8. NVS sees mail, waits for Track NVSCB control block and "B" segments (if not there), then commits data by building NVS control block for track using NVS segments 0 and 1. The "Use A or B indicator" is switched to "use B".

N9. NVS sends "commit complete" mail to Cache.

C10. Cache sees complete mail from both adapter and NVS.

C11. Cache update control block with segments and sectors written in both Cache/NVS and frees NVS track buffer.

C12. Cache sends write complete message to host adapter.

Note: The steps C5, H5 and H6 generally occur asynchronously. The NVS only knows that it has something to commit when it sees the host adapter mail. The NVS must wait for step C5 to occur to know which segments to use next time.

Figure 4:
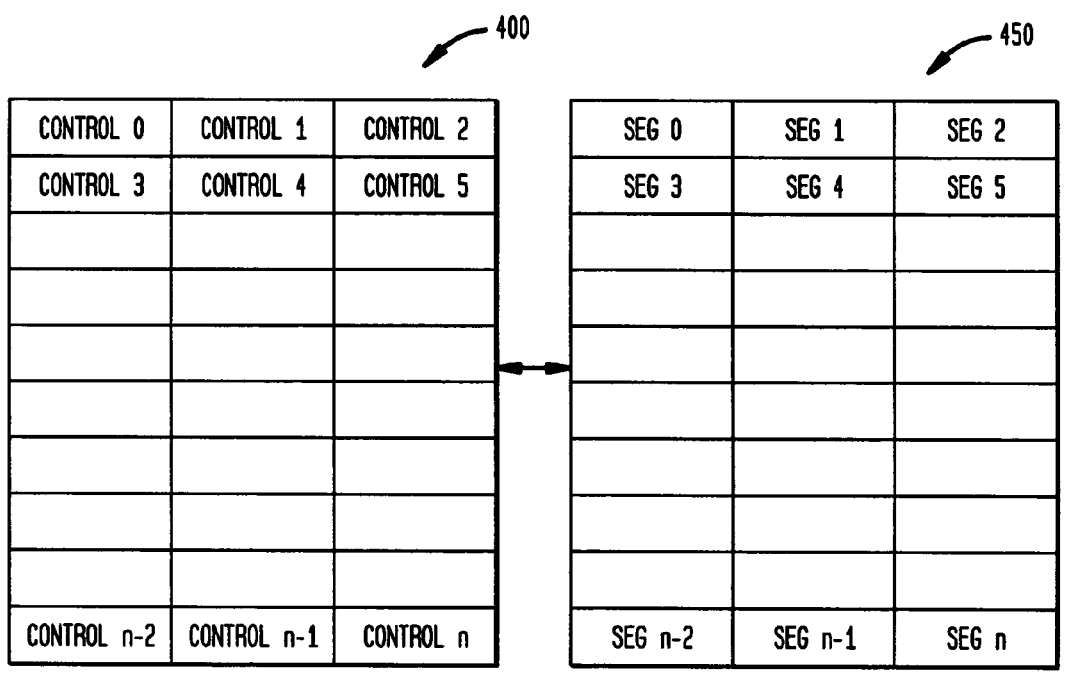
FIG. 4 illustrates cache control blocks for tracks, and the corresponding cache customer segments, which are seen by the host adapters.

FIG. 4 illustrates cache control blocks for tracks, and the corresponding cache customer segments, which are seen by the host adapters. The control blocks 400, e.g., control 0, control 1, ..., control n-1, control n, have a 1:1 relationship with the customer segments 450, e.g., segment 0, segment 1, ..., segment n-1, segment n.

Figure 5:
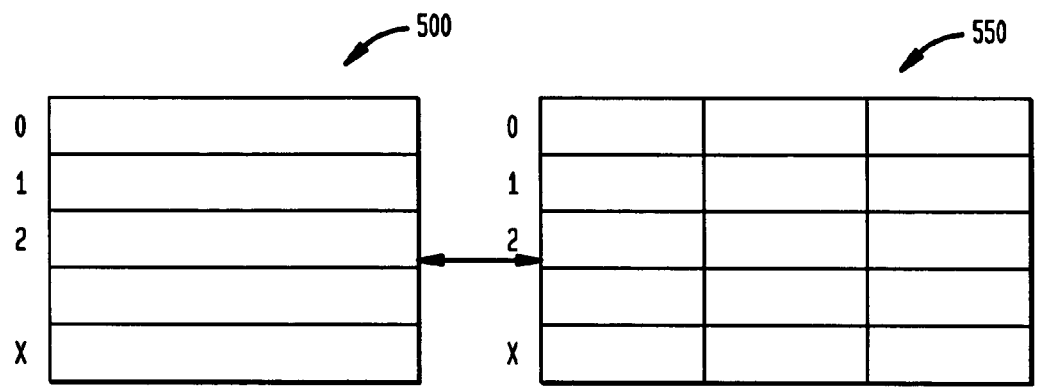
FIG. 5 illustrates track NVS control blocks and the corresponding track buffers seen by the host adapters.

FIG. 5 illustrates track NVS control blocks and the corresponding track buffers seen by the host adapters and real contiguous memory. The track NVS control blocks 500, e.g., 0, 1, 2, ..., x, have a 1:1 relationship with the track buffers 550, which are seen by the host adapters and real contiguous memory, e.g., 0, 1, 2, ..., x.

Figure 6:
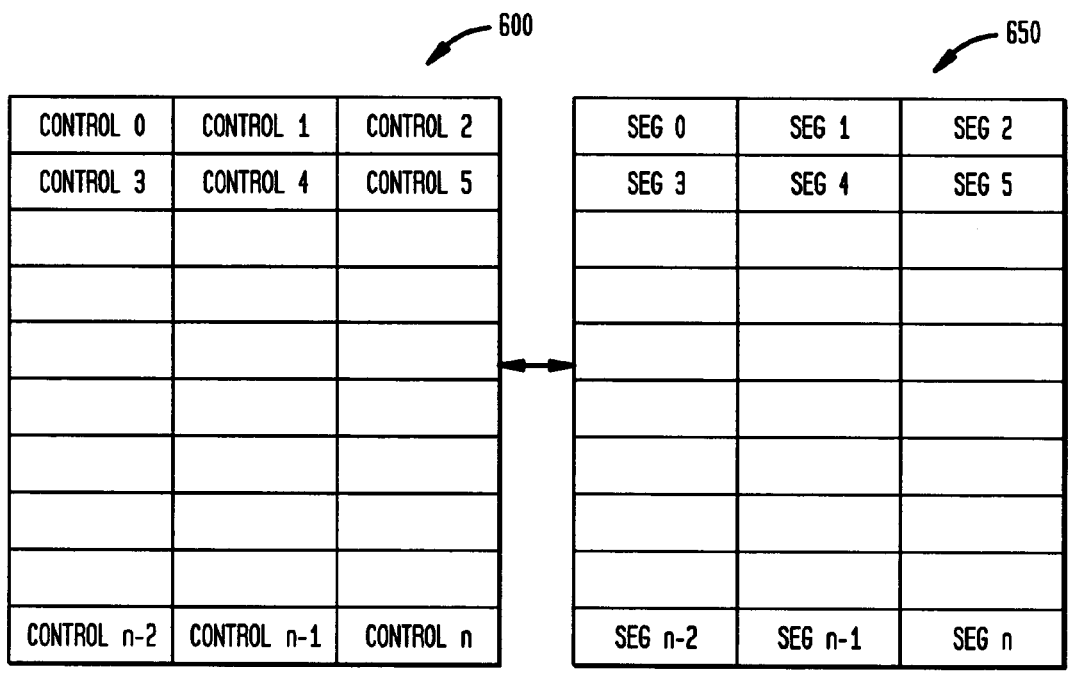
FIG. 6 illustrates NVS control blocks for tracks, and the corresponding NVS customer segments, which are not seen by the host adapters.

FIG. 6 illustrates NVS control blocks for tracks, and the corresponding NVS customer segments not seen by the host adapters. The NVS control blocks 600, e.g., control 0, control 1, ..., control n-1, control n, have a 1:1 relationship with the NVS customer segments 650, e.g., segment 0, segment 1, ..., segment n-1, segment n.

Figure 7:
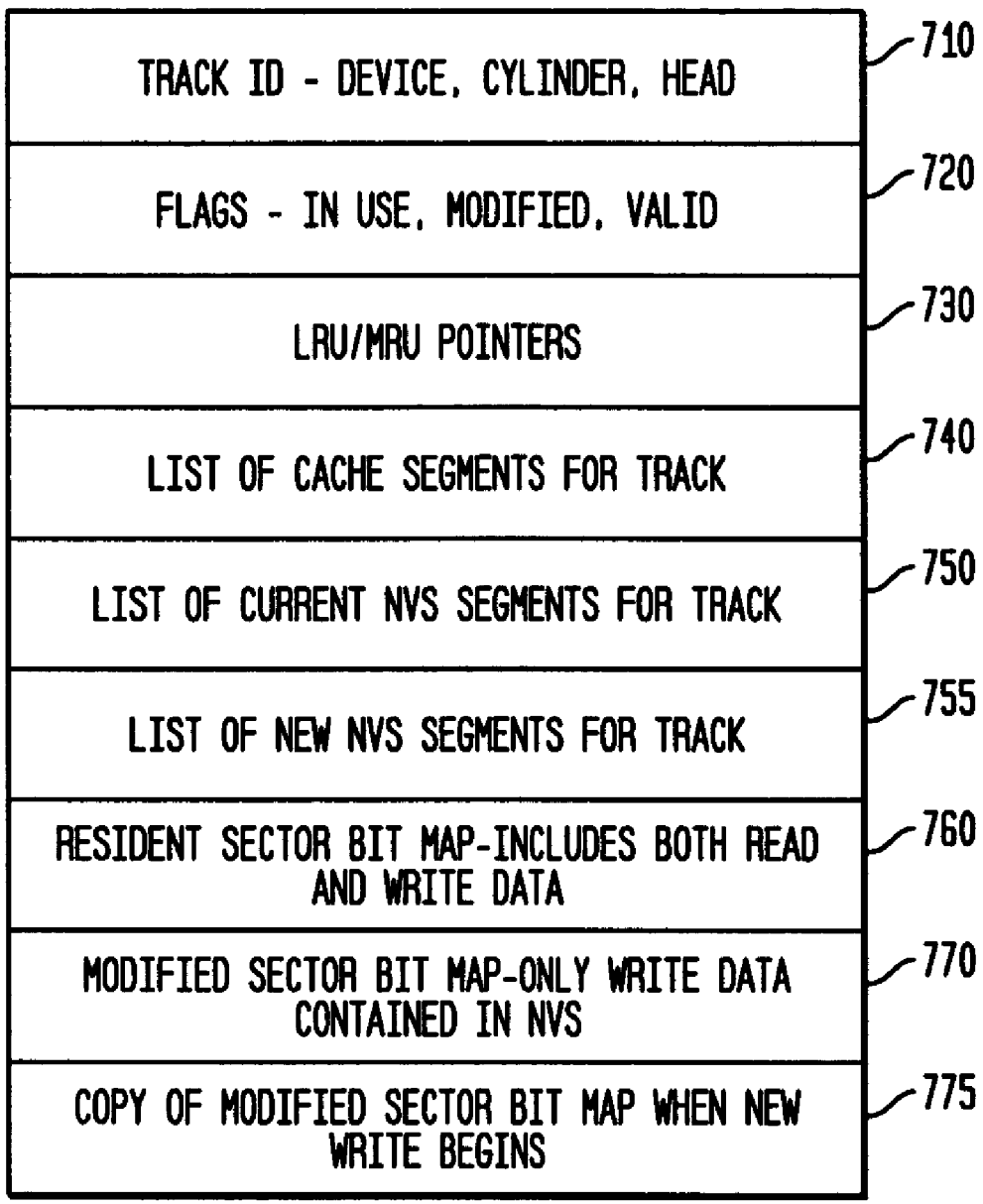
FIG. 7 illustrates a cache control block data structure.

FIG. 7 illustrates a cache control block data structure 700. The data structure 700 includes a Track Identifier 710, such as device, cylinder and head. Generally, the disk tracks in a storage server may be identified, e.g., by device, cylinder, and head. The device can be a disk drive in the disk arrays 160 (FIG. 1), while the cylinder may be a unit of storage with a fixed number of tracks, e.g., fifteen tracks, on a disk. Typically, there are thousands of cylinders in a device. The head is the read/write head on a disk drive. Any appropriate identifier may be used. For example, the identifier of the device may be a serial number, while the identifiers of the cylinder and head may be based on their locations, e.g., cylinder 1, 2, 3, ..., head 1, 2, 3, .... Flags 720, such as in use, modified and valid describe the corresponding customer data.

LRU/MRU Pointers 730 relate to a least recently used (LRU)/most recently used (MRU) list for track images. Each track image is associated with a track in the disk arrays. For write data, e.g., modified data, the track image is associated with a track in the disk arrays 160 at which the associated cache data is to be written. For read data, the track image is associated with a track in the disk arrays 160 from which the associated cache data was read. Each track image may comprise the amount of data that can be stored in one revolution of a disk in the disk arrays 160, e.g., 60 kB.

The data structure 700 further includes a list of Cache segments for track 740, a list of current NVS segments for track 750, a list of new NVS segments for track 755, a resident sector bit map 760, which includes both read and write data, a modified sector bit map 770, which includes only write data contained in NVS, and a copy of the modified sector bit map when a new write begins 775.

Figure 8:
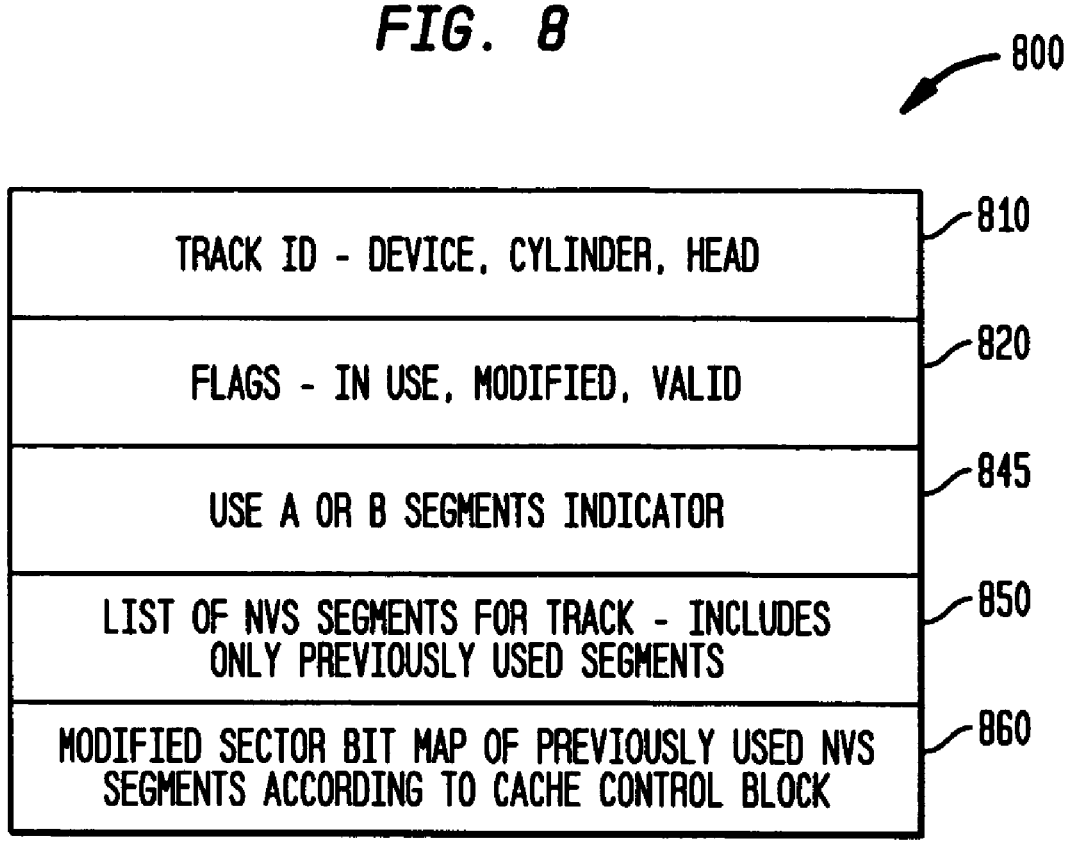
FIG. 8 illustrates an NVS control block data structure.

FIG. 8 illustrates an NVS control block data structure 800, which includes a Track Identifier 810, such as device, cylinder and head, flags 820, such as in use, modified and valid, an indicator indicating whether to use the A or B segments 845, a list of NVS segments for track 850, which includes only previously used segments, and a modified sector bit map 860 of previously used NVS segments according to the cache control block 700.

FIG. 9 illustrates track buffer control blocks 900 and the corresponding virtual track buffers 950 seen by the host adapters, but not the contiguous memory. The virtual track buffers 950 contain real customer segments. The track buffer control blocks 900 have a 1:1 relationship with the virtual track buffers 950. For example, track buffer control blocks 900 may indicate the "A" segments (entry 902), the track NVSCB (NVS control block-entry 904), the "B" segments (entry 906), and the "Use A or B" segments indicator (entry 908). Furthermore, the NVS control blocks for tracks have a 1:1 relationship with the NVS customer segments, which are seen by the host adapters, in the manner indicated by FIG. 4.

FIG. 10 illustrates a virtual track buffer data structure. The data structure 900 of FIG. 9 is illustrated in further detail. The "A" segments entry 902 provides a list of real NVS segments used for a write to the track buffer. The Track NVSCB entry 904 shows the cache a view of the track in NVS. The "B" Segments entry 906 provide a list of real NVS segments used for a write to the track buffer. The "Use A or B segments" indicator entry 908 indicates which list or set of segments were used for the write from the host adapter. During initialization, the cache code will allocate real NVS segments for each "virtual track buffer", initialize the "A" segment list 902, and set the "Use A or B indicator" 908 to "Use A". The entire data structure is then sent to the NVS before any host adapter writes are allowed. If we take a simple case of two "virtual track buffers" and each customer track can be held in two NVS segments, the structure of FIG. 11 will result. However, other variations are possible.

FIG. 11 illustrates an example of the virtual track buffer data structure. A first track buffer, track buffer 0 (1100), includes entries 1102, 1104, 1106 and 1108. Entry 1102 indicates that segments 0 and 1 are the real NVS "A" segments used for a write to the track buffer. Entry 1104 indicates the track NVS control block at initial value. Entry 1106 is uninitialized. Entry 1108 indicates that the "A" segments should be used. A second track buffer, track buffer 1 (1110), includes entries 1112, 1114, 1116 and 1118. Entry 1112 indicates that segments 2 and 3 are the real NVS "A" segments used for a write to the track buffer. Entry 1114 indicates the track NVSCB at initial value. Entry 1116 is uninitialized. Entry 1118 indicates that the "A" segments should be used.

After the first write operation, the virtual track buffer structure of FIG. 12 will result. After the first write has completed to segments 0 and 1 (block 1102 in FIG. 11), segments 0 and 1 are no longer part of the virtual track buffer, but contain customer data. Block 1102 in FIG. 12 therefore indicates the space occupied by segments 0 and 1 is now uninitialized. Furthermore, entry 1106 is changed to indicate that segments 4 and 5 are the "B" segments, and entry 1108 is changed to indicate that the "B" segments should be used for writing additional data. Thus, the next time the track buffer 0 is used, the data will be sent to NVS segments 4 and 5, and new segments will be sent into the "A" segment list. The entries 1112, 1114, 1116 and 1118 for the track buffer 1 (1110) are unchanged.

An update write scenario to the same track can be provided as follows. Steps 1 and 2 are the same as steps H1 and H2 as discussed in connection with FIG. 3. In Step C3, the cache will now allocate NVS segments 6 and 7. The cache will allocate track buffer 1, and move segments 6 and 7 from the cache control block to "B" segments, and move segments 2 and 3 to the cache control block. Cache steps C4 and C5 use track buffer 1. Host adapter step H5 uses buffer 1 and segments 2 and 3. NVS step N8 changes as follows:
1. If the entire track was written again, then the NVS control block for the track is updated to reflect that segments 2 and 3 have the data.
2. If either segment is completely written, then the NVS control block for the track is updated to reflect the new segment.
3. If a segment is partially written, then the customer data in the segment with the least amount of date-data is copied to the segment with the most amount of data.
All other steps remain the same.

In the event of a power loss at the storage server 100 at NVS step N8, after the mail has landed in the NVS memory, and before the track buffer control block from cache step C5 has landed in the NVS memory, then the following steps occur during the next power on:
1. NVS sends cache an NVS control block for each track within NVS to allow cache to know which NVS segments are in use and which segments are not in use.
2. NVS processes each commit mail message from above:
a. determine track id and virtual track buffer used form commit mail message.
b. determine whether A or B segments were used for the write from the virtual track buffer control block.
c. send mail message to cache indicating the exact NVS segments to allocate for the track, knowing which segments were used for the write before the power loss occurred, and indicating the correct setting for the "Use A or B" indicator. The cache then builds and sends a track buffer control block for the specified track buffer to allow the commit operation to complete.
d. when the track buffer control block arrives, the NVS can then commit the customer data.

NVS n-1 customer data protection can be provided as follows. A write process from a host adapter to both cache and NVS can occur and proceed up to step H6. At any point, the host can abort out of the write. If host adapter step H5 has occurred, then the n–1 version of the cache data for the track has been overwritten (either partially or completely) with the new data that is no longer wanted. The n-1 version of the NVS data for the track is still safe in the NVS segments, since the new data was written to newly allocated NVS segments. The NVS can send the safe n–1 data back to the cache to once again have two copies of the data.

Figure 13:
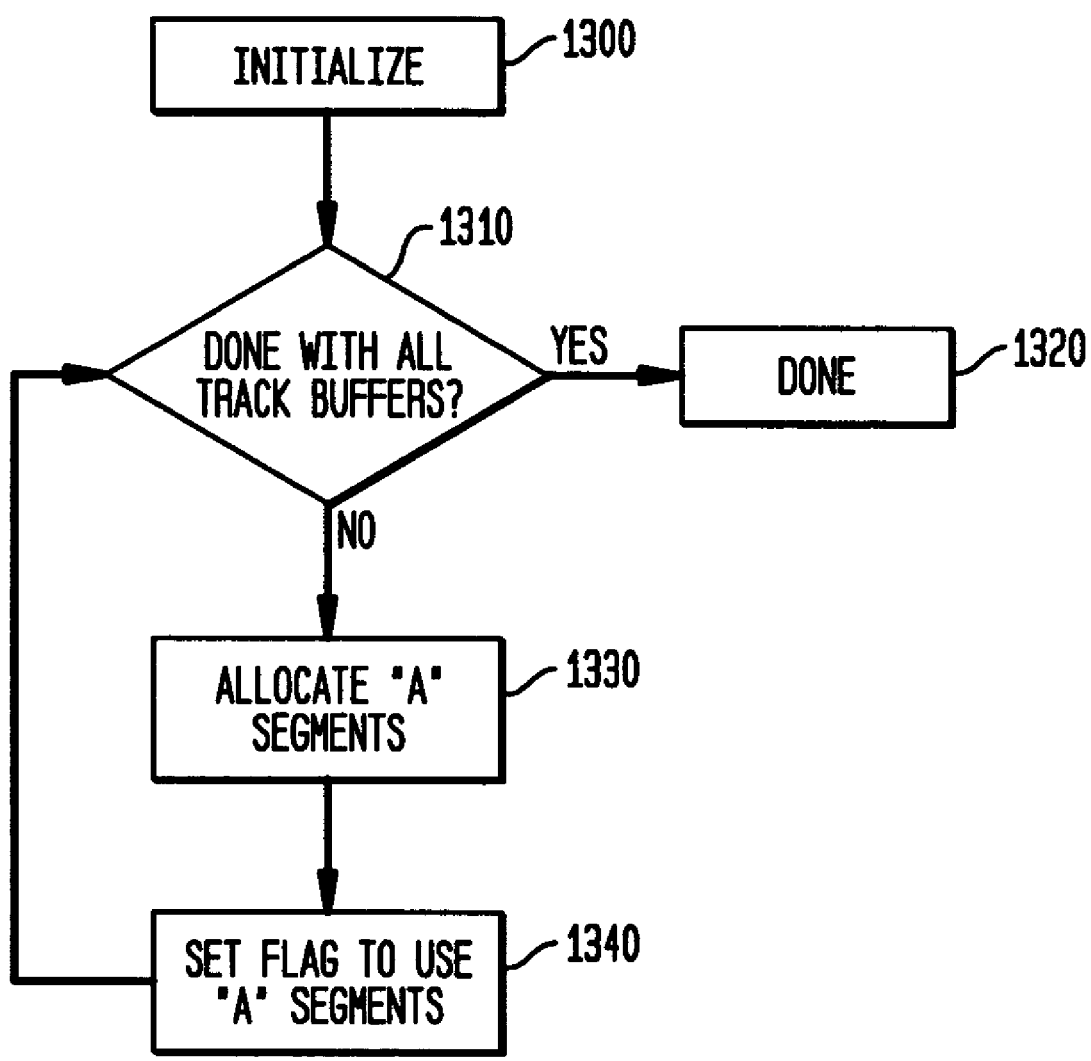
FIG. 13 illustrates a method for allocating segments for each virtual track buffer.

FIG. 13 illustrates a method for allocating segments for each virtual track buffer. The flowchart shows the initialization of allocating the "A" segments for each virtual track buffer. An initialization process begins at block 1300. When all track buffers have been initialized, the process is complete (block 1320). At block 1330, the first set of segments, termed "A" segments, are allocated, and a flag is set to use the "A" segments for storing customer data (block 1340).

Figure 14:
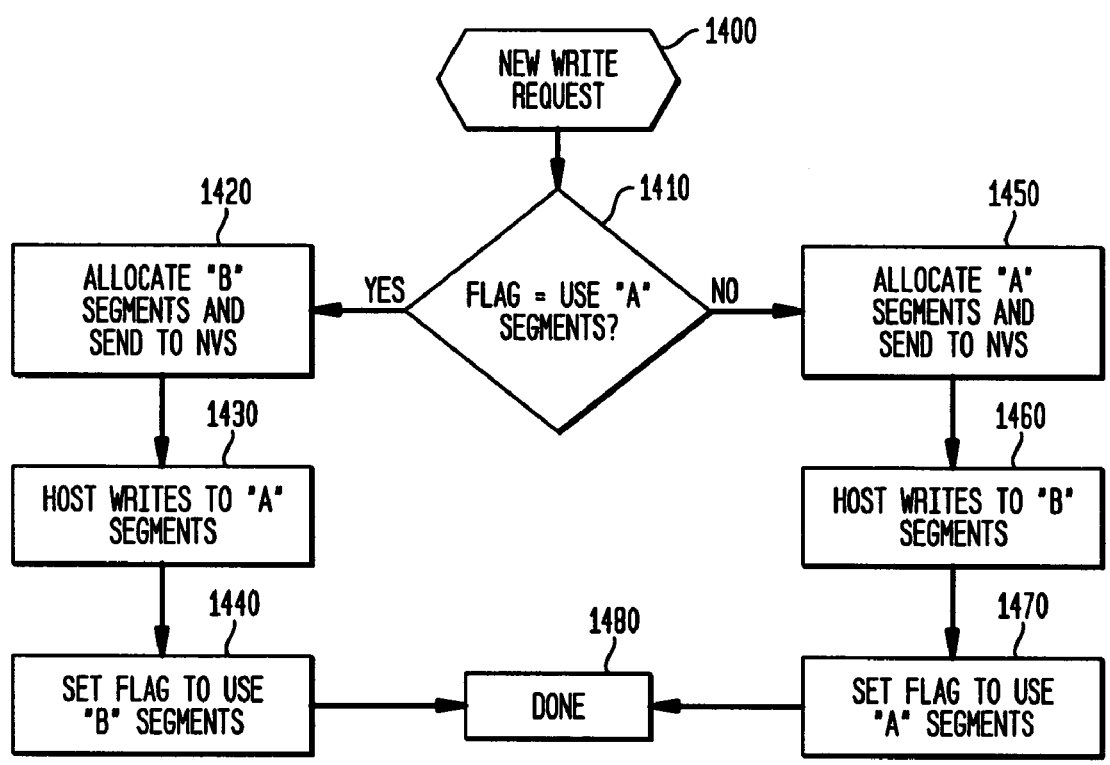
FIG. 14 illustrates a method for pre-allocating segments for a new write request.

FIG. 14 illustrates a method for pre-allocating segments for a new write request. The flowchart shows new write request processing for pre-allocating a second set of segments when a write request occurs for a first set of segments, and shows the toggle between the "A" and "B" segments. When a new write request is received from a host adapter for writing customer data (block 1400), and the flag in the track buffer (see FIGS. 11 and 12) is set to use the "A" segments, the "B" segments are allocated and sent to the NVS. The "B" segments are thus pre-allocated for storing additional data. At block 1430, the host adapter writes the current customer data to the "A" segments. At block 1440, the flag is set to use the "B" segments for the next write request, and the process ends at block 1480. If the flag is not set to use the "A" segments at block 1410, the "A" segments are allocated and sent to the NVS at block 1450. At block 1460, the host adapter writes the current customer data to the "B" segments. At block 1470, the flag is set to use the "A" segments for the next write request, and the process ends at block 1480. The "A" segments are thus pre-allocated for storing additional data. In this way, the use "A" or "B" segments flag is alternatingly set so that the first and second sets of segments are alternately selected for storing the customer data for which a write request has been made.

Figure 15:
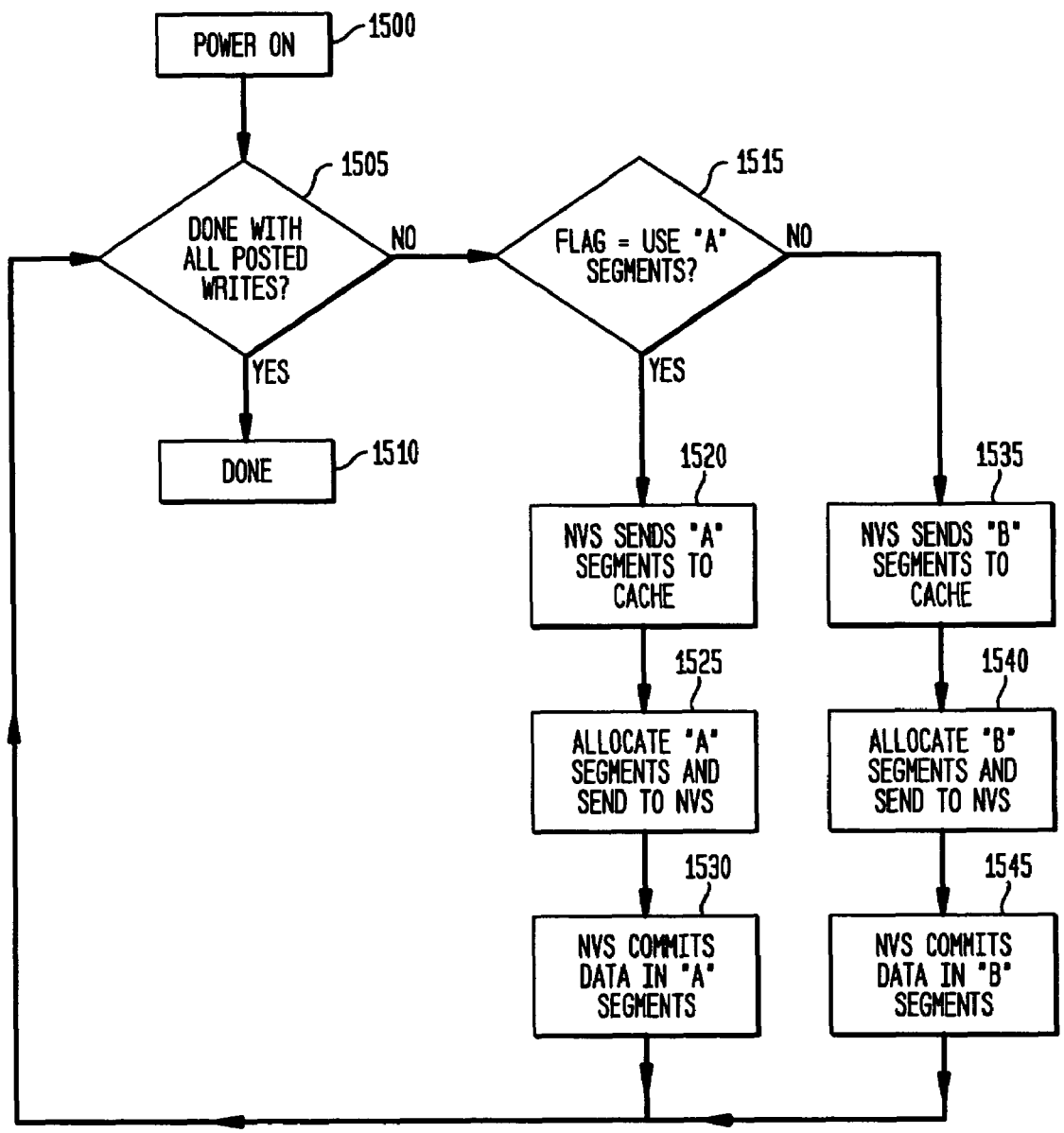
FIG. 15 illustrates a method for processing write requests following a power loss.

FIG. 15 illustrates a method for processing write requests following a power loss. Based on the use "A" or "B" segments flag, the NVS tells the cache which segments to allocate, and then commits the customer data that resides in those segments. In particular, when the power comes back on following a power loss, at block 1500, it is determined whether all posted writes have been completed (block 1505). If this is true, the process ends at block 1510. If all posted writes have not been completed, and if the flag in the track buffer is set to use the "A" segments (block 1515), the NVS sends the "A" segments to cache (block 1520). The "A" segments are allocated and sent to the NVS (block 1525), and the NVS commits the data in the "A" segments (block 1530). If the flag in the track buffer is not set to use the "A" segments (block 1515), e.g., it is set to use the "B" segments or even other sets of segments, the NVS sends the "B" segments to cache (block 1535). The "B" segments are allocated and sent to the NVS (block 1540), and the NVS commits the data in the "B" segments (block 1545).

While the invention has been illustrated in terms of a dual cluster storage server, it is applicable as well to multi-cluster systems having higher levels of redundancy as well as to single cluster systems.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for storing customer data at a non-volatile (NVS) at a storage server, comprising:
    initializing the NVS, prior to receiving a first write request at the storage server for writing first customer data to the NVS, by allocating first segments in the NVS for storing data;
    in response to receiving the first write request, allocating second segments in the NVS for storing second customer data;
    maintaining a virtual track buffer identifying at least the first and second segments; and
    maintaining a flag identifying which of the at least first and second segments to use for storing customer data for which a write request has been made.

2. The method of claim 1, further comprising:
    alternatingly setting the flag so that the at least first and second segments are alternatingly selected for storing the customer data for which a write request has been made.

3. A method for storing customer data at a non-volatile storage (NVS) at a storage server, comprising:
    initializing the NVS, prior to receiving a first write request at the storage server for writing first customer data to the NVS, by allocating first segments in the NVS for storing data;
    in response to receiving the first write request, allocating second segments in the NVS for storing second customer data, wherein customer data for which a write request has been made is stored in the NVS in successive commit processes;
    maintaining in the NVS, across a power loss, information identifying which of the first and second segments is involved in a current one of the successive commit processes.

4. The method of claim 3, further comprising: receiving a second write request at the storage server for writing the second customer data to the NVS;
    writing the second customer data to the second segments in the NVS; and
    in response to receiving the second write request, allocating third segments in the NVS for storing third customer data.

5. The method of claim 3, further comprising: maintaining a cache control block for allocating the first and second segments in the NVS.

6. The method of claim 3, further comprising: maintaining a virtual track buffer for allocating the first and second segments in the NVS.

7. The method of claim 3, wherein:
    the first write request is received at a cache at the storage server from a host adapter at the storage server.

8. The method of claim 3 wherein:
    following commit processing of the first customer data at the NVS, the NVS prepares to use the second segments to store the second customer data for a subsequent write request.

9. An apparatus for storing customer data at a non-volatile storage (NVS) at a storage server, comprising:
    means for initializing the NVS, prior to receiving a first write request at the storage server for writing first customer data to the NVS, by allocating first segments in the NVS for storing data; and
    means for allocating second segments in the NVS, in response to receiving the first write request, for storing second customer data; and
    means for maintaining in the NVS, across a power loss, information identifying which of the first and second segments is involved in a current one of successive commit processes.

10. The apparatus of claim 9, further comprising:
    means for receiving a second write request at the storage server for writing the second customer data to the NVS;
    means for writing the second customer data to the second segments in the NVS; and
    means for allocating, in response to receiving the second write request, third segments in the NVS for storing third customer data.

11. The apparatus of claim 9, further comprising:
    means for maintaining a cache control block for allocating the first and second segments in the NVS.

12. The apparatus of claim 9, further comprising:
    means for maintaining a virtual track buffer for allocating the first and second segments in the NVS.

13. The apparatus of claim 9, wherein:
    the first write request is received at a cache at the storage server from a host adapter at the storage server.

14. The apparatus of claim 9, wherein:
    following commit processing of the first customer data at the NVS, the NVS prepares to use the second segments to store the second customer data for a subsequent write request.

15. An apparatus for storing customer data at a non-volatile storage (NVS) at a storage server, comprising:
    means for initializing the NVS, prior to receiving a first write request at the storage server for writing first customer data to the NVS, by allocating first segments in the NVS for storing data;
    means for allocating second segments in the NVS, in response to receiving the first write request, for storing second customer data;
    means for maintaining a virtual track buffer identifying at least the first and second segments; and
    means for maintaining a flag identifying which of the at least first and second segments to use for storing customer data for which a write request has been made.

16. The apparatus of claim 15, further comprising:
    means for alternatingly setting the flag so that the at least first and second segments are alternatingly selected for storing the customer data for which a write request has been made.

17. A program storage device, tangibly embodying a program of instructions executable by a machine to perform a method for storing customer data at a non-volatile storage (NVS) at a storage server, the method comprising the steps of:

initializing the NVS, prior to receiving a first write request at the storage server for writing first customer data to the NVS, by allocating first segments in the NVS for storing data;

in response to receiving the first write request, allocating second segments in the NVS for storing second customer data; and maintaining in the NVS, across a power loss, information identifying which of the first and second segments is involved in a current one of the successive commit processes.

18. The program storage device of claim 17, wherein the method further comprises:

receiving a second write request at the storage server for writing the second customer data to the NVS;

writing the second customer data to the second segments in the NVS; and in response to receiving the second write request, allocating third segments in the NVS for storing third customer data.

19. The program storage device of claim 17, wherein the method further comprises:

maintaining a cache control block for allocating the first and second segments in the NVS.

20. The program storage device of claim 17, wherein the method further comprises:

maintaining a virtual track buffer for allocating the first and second segments in the NVS.

21. The program storage device of claim 17, wherein:

the first write request is received at a cache at the storage server from a host adapter at the storage server.

22. The program storage device of claim 17, wherein:

following commit processing of the first customer data at the NVS, the NVS prepares to use the second segments to store the second customer data for a subsequent write request.

23. A program storage device tangibly embodying a program of instructions executable by a machine to perform a method for storing customer data at a non-volatile storage (NVS) at a storage server, the method comprising the steps of:

initializing the NVS, prior to receiving a first write request at the storage server for writing first customer data to the NVS, by allocating first segments in the NVS for storing data;

in response to receiving the first write request, allocating second segments in the NVS for storing second customer data;

maintaining a virtual track buffer identifying at least the first and second segments; and maintaining a flag identifying which of the at least first and second segments to use for storing customer data for which a write request has been made.

24. The program storage device of claim 23, wherein the method further comprises:

alternatingly setting the flag so that the at least first and second segments are alternatingly selected for storing the customer data for which a write request has been made.

25. A method for storing customer data at a non-volatile storage (NVS) at a storage server, comprising:

initializing the NVS, prior to receiving a first write request at the storage server for writing first customer data to the NVS, by allocating first segments in the NVS for storing data; and in response to receiving the first write request, allocating second segments in the NVS for storing second customer data, if a segment is partially written, customer data in a segment with the least amount of data is copied to a segment with the most amount of data.

* * * * *